No. 745,389. PATENTED DEC. 1, 1903.
J. H. RUSSELL.
MACHINE FOR STRINGING BLANKS.
APPLICATION FILED NOV. 8, 1901.
NO MODEL. 3 SHEETS—SHEET 3.

No. 745,339. Patented December 1, 1903.

UNITED STATES PATENT OFFICE.

JAMES H. RUSSELL, OF PHILADELPHIA, PENNSYLVANIA, ASSIGNOR TO WELSBACH LIGHT COMPANY, OF GLOUCESTER CITY, NEW JERSEY, A CORPORATION OF NEW JERSEY.

MACHINE FOR STRINGING BLANKS.

SPECIFICATION forming part of Letters Patent No. 745,389, dated December 1, 1903.

Application filed November 8, 1901. Serial No. 81,644. (No model.)

*To all whom it may concern:*

Be it known that I, JAMES H. RUSSELL, a citizen of the United States, residing at Philadelphia, in the county of Philadelphia and State of Pennsylvania, have invented certain new and useful Improvements in Machines for Stringing Blanks, of which the following is a specification.

The present invention relates to improvements in machines of the type mentioned which have a head and fingers for shirring the blank and also have needles that are passed through the head and blank in order to receive the strings from suitable devices and draw them through the blank.

Objects of the invention are to improve the operation of such machines and to obviate certain defects and disadvantageous features which hitherto existed in them, to provide against breakage of the latches of the needles, to provide for renewal of the needles, to simplify and improve the string holding and delivering mechanism, and to relieve the operator in manipulating the strings.

To these and other ends hereinafter set forth the invention, stated in general terms, comprises the improvements hereinafter described and claimed.

The nature, characteristic features, and scope of the invention will be more fully understood from the following description, taken in connection with the accompanying drawings, forming part hereof, and in which—

Figure 1:
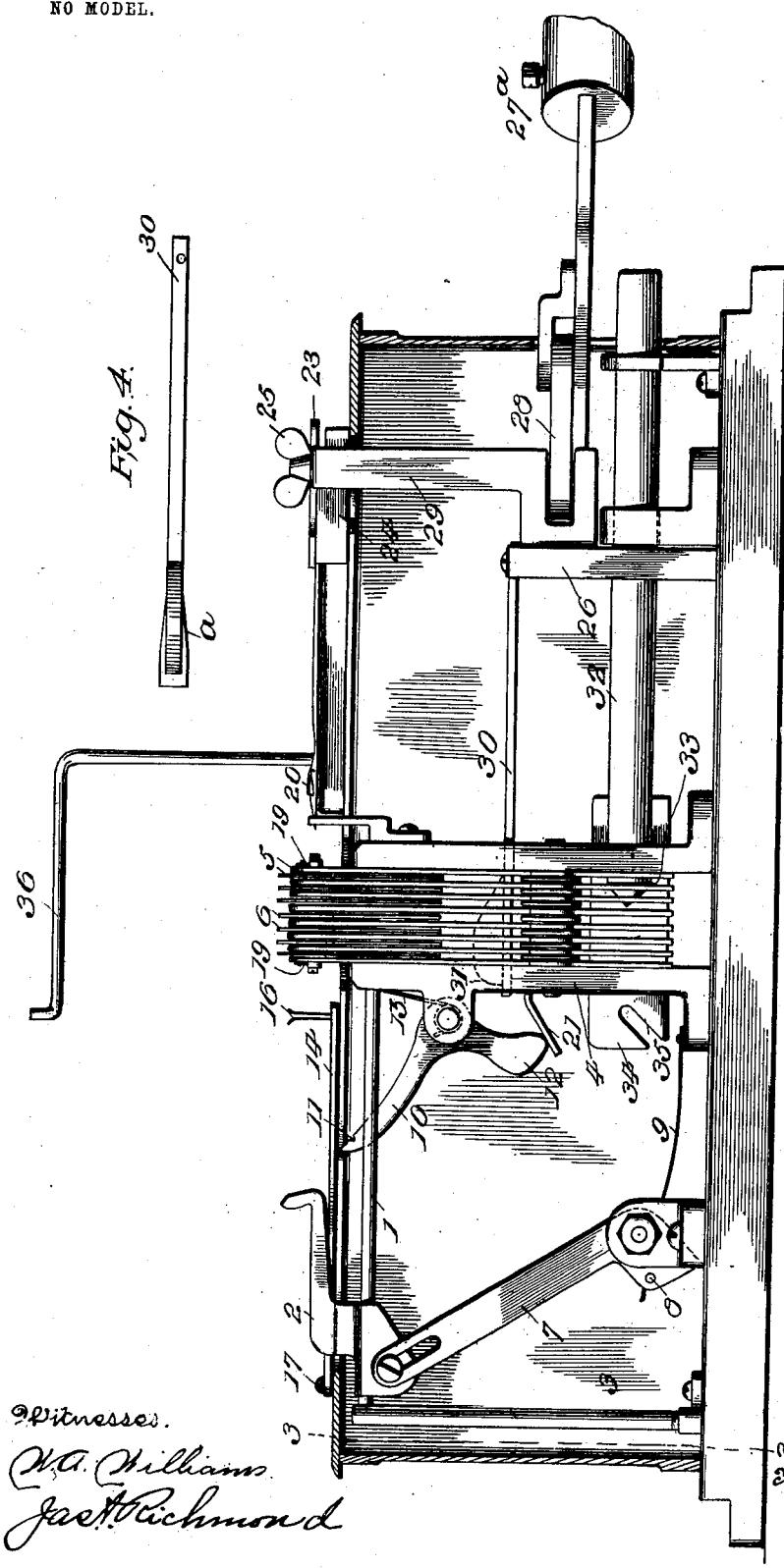
Figure 2:
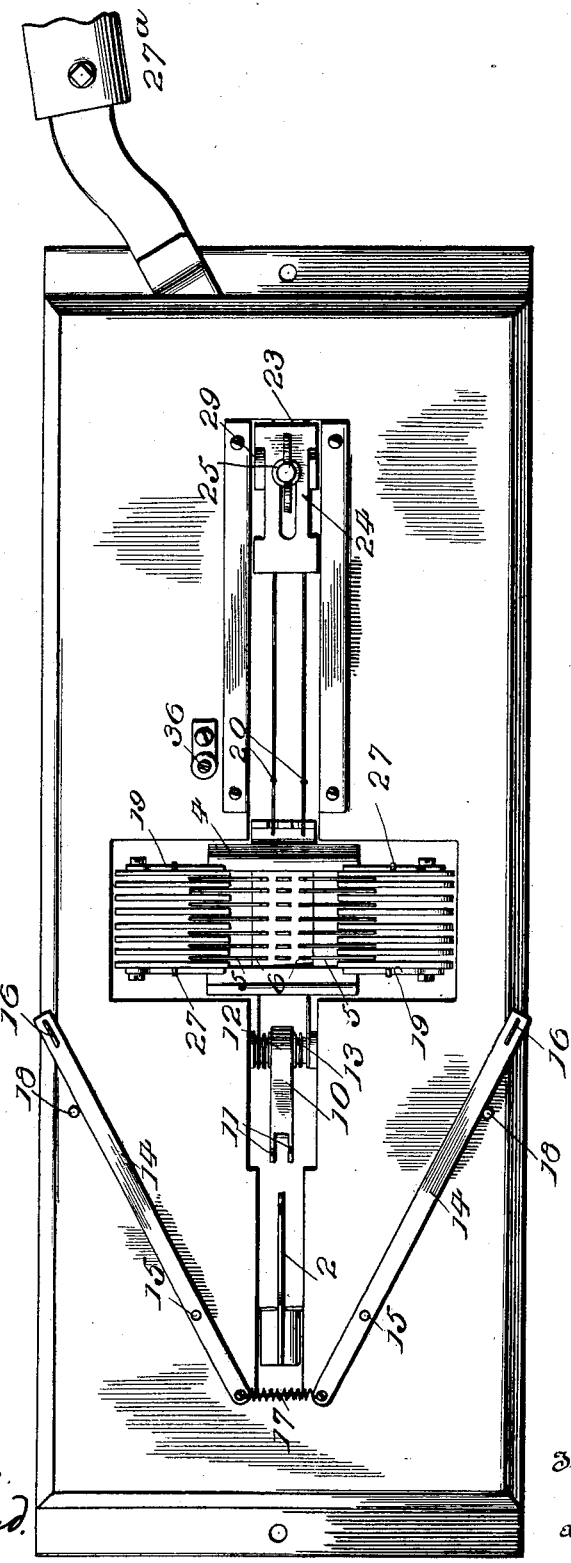
Figure 3:
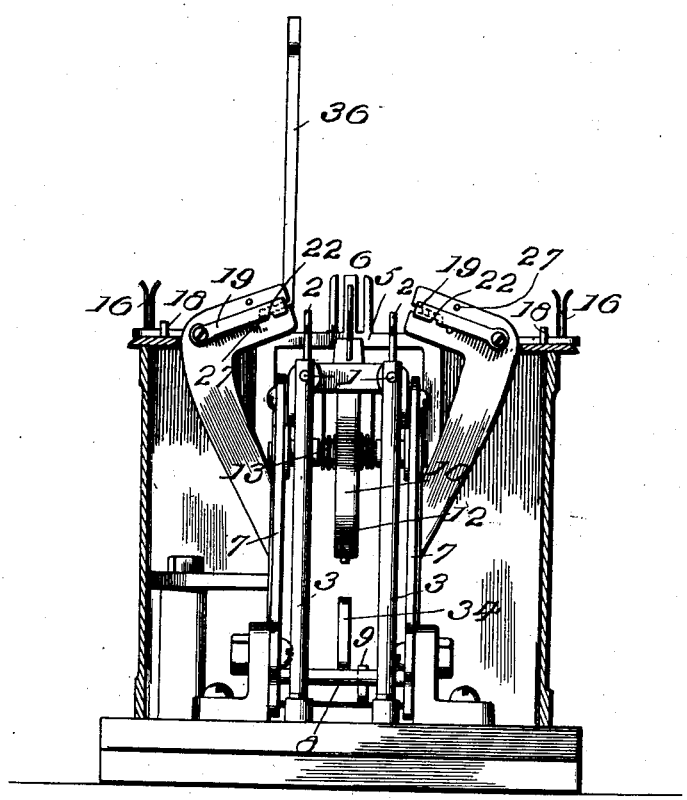

Figure 1 is a sectional view of a machine embodying features of the invention. Fig. 2 is a top or plan view of the same, and Fig. 3 is a transverse sectional view taken on the line 3 3 of Fig. 1. Fig. 4 is a plan view of a portion of a cam-rod 30.

In the drawings, 1 represents ways upon which the hook 2 reciprocates. As shown, the ways comprise parallel rods supported by standards 3 and by the framework 4, that carries the folders 5 and folder-head 6, and the shank of the hook is provided with openings which slide upon these rods. The motion of the hook is therefore a rectilinear one in a horizontal plane. The rocker-arm 7 has slot-and-pin connection with the hook, and it is suitably pivoted to the base of the machine. As shown, the rocker-arm 7 is made in two parts, each part being arranged upon the outside of the shank of the hook, and at the base the two parts are connected by a transversely-ranging crank-pin 8 and are separately pivoted, as shown in Fig. 3.

9 is a spring which tends to shift the rocker-arm and hook into the position shown in Fig. 1.

To the framework of the folder-head is pivoted the finger 10, which is notched, as at 11, for engagement with a string, as will be hereinafter described. The finger 10 is provided with a cam projection 12, and it is acted upon by a spring, as 13, which tends to shift it into the position shown, in which it rests upon its back-stop 21.

Upon the top of the machine, Fig. 2, are arranged string-holders 14, pivoted, as at 15, and provided at their ends with split pins 16.

17 is a spring which tends to shift the string-holders into engagement with their back-stops 18. The string-holders therefore are spring-actuated and are capable of motion within limits. Their purpose will be hereinafter described fully; but it is to facilitate the operator by relieving him from the necessity of manipulating the string during a part of the operation. The folders, which occupy positions on the outside of the folder-head, are provided with openers and closers 19 for the latches 20 of the needles. These openers and closers 19 comprise blades pivoted to the folders and afford a range of motion between stops 27. The blades or openers and closers 19 are notched, as at 22, in vertical alinement with the openings in the folders through which the needles are to pass, and they practically cover these openings, so as to insure their engagement with the needle-latches. Of course they leave enough of the openings uncovered to enable the needle-points to enter. These notches are made for the purpose of allowing the points of the needles to properly penetrate the folders. The purpose of the openers and closers is for those on the right to insure the proper opening of the latches when the needles are proceeding toward the left to receive the string and for those on the left to insure the proper closing of the same when they are proceeding toward the right with the string. The described construction of openers and closers is obviously simple and in practice very efficient and reliable. The plate 23, which overlies the needles and secures them to their holder 24, is slotted at its edges and also in its center, and at the center there is a clamp-nut 25, so that the plate 23 can be shifted toward the right in order to remove the needles or to replace them and can be then replaced and clamped by means of the nut 25. This affords a convenient and reliable means for holding the needles and for permitting of their convenient renewal. The slide or part 26 is arranged to slide backward and forward horizontally, and it is shifted by means of the hand-lever 27ᵃ through the intervention of a link 28 or in any other suitable way. The part 26 is fitted with a bracket 29, which carries the needle-holder and works back and forth in a slot in the top of the machine. The part 26 also carries a cam-rod 30, guided in the framework of the folder-head and fitted with a cam 31, that coöperates with the cam projection 12, so as to lift it from its backstop 21 and turn it so as to effect the required movements of the finger 10. The cam-rod 30 when viewed in plan, Fig. 4, is seen to have an enlarged end $a$, which serves to open the folders, as will be hereinafter described. The slide 26 also carries a rod 32, guided by suitable brackets and having its end 33 pointed, so as to close the folders. This rod 32 is also fitted with a part or knife-cam 34, having a slot 35, which engages the crank-pin 8.

Having thus described the principal features of construction of the machine, its mode of operation, as well as certain other features of construction, may be described as follows: When the parts are in the positions shown in the drawings, a suitable blank is placed over the folder-head and, if necessary, supported by the rod 36. The handle 27ᵃ is then shifted, with the result that the slide 26 is moved toward the left in Fig. 1. This motion of the slide causes the needles, the cam 31, the part 33, and the slot 35 to be shifted toward the left. As the needles pass under the openers on the faces of the right-hand folders the openers serve to positively open the latches. The part 33 serves to close the folders in onto the folder-head, thus, as it were, fluting the blank, so that the needles pass through the flutes. The cam 31 runs under the projection 12 and throws the finger 10 toward the right, and the notch or groove 35 engages the crank-pin 8 and slides the hook 2 toward the right on its straight horizontal ways. The string is then placed with its ends in the split pins 16 and its bight around the fingers 10 and in engagement with the hook 2. It also lies in the hooks of the needles whose latches are open; but it bears upon the fingers 10 rather than on the hooks of the needles, because the latter are not well adapted to bear the strain, which at the commencement of the return movement of the handle 27ᵃ is considerable and which is borne, as has been said, by the fingers 10. When the notches 11 are present, the string passes over them. As the handle 27ᵃ is returned to its original position the hook 2 is moved by the cam 35 toward the left, and thus draws the bight of the string toward the left and pulls the string-holders 14 inward, the strain being taken by the fingers 10, which are properly positioned and held for resisting it by the cam 31. As the return motion of the handle 27ᵃ continues the ends of the string pull out of the parts 16. The hook 2 is freed from the influence of the cam 35 and is brought under the influence of the spring 9, which is comparatively light, so that the hook assumes a position more or less midway of its travel and finally moves up toward the right. During this time it is substantially regulating the tension and is drawn along toward the right by the pull of the needles on the string. During this time and while the hook is under the influence of the spring 9 the cam 31 has released the fingers 10, so that they come into the position shown in the drawings; but when this occurs they have done their work in taking the initial pull of the hook on the string from the needles. It is to be understood that when the hook is under the influence of the spring 9 the needles can easily sustain the pull which they exert on the string. As the handle 27ᵃ is thus being returned to its initial position the part $a$ of the rod 30 serves to open the folders in order to permit of the removal of the blank in which the string has been inserted. It will be understood that when the blank is removed from the folder-head the bight of the string is lifted off the hook 2. Before the needles reach the blank the closers 19 on the left-hand folders serve to positively close their latches. In the finished blank as it leaves the machine the bight of the string projects on one side and the two free ends of the string project on the other side.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. In a machine of the class specified the combination of means for gathering or folding a blank, needles for threading or drawing strings through the blank, a hook between said needles for engaging the string, and means for imparting rectilinear motion to the hook, substantially as described.

2. In a machine of the class specified, needle mechanism, a hook between the needles, rectilinear guides or ways for the hook, and means for reciprocating the hook on its guides or ways, substantially as described.

3. In a machine of the class specified, needle mechanism, rectilinear guides or ways, a hook arranged between the needles and to slide on said guides or ways, a rocker-arm, and a slot-and-pin connection between the arm and hook, substantially as described.

4. In a machine of the class specified the combination of needle mechanism, the folder-head and folders, a hook, rectilinear guides for the hook, a rocker-arm operatively connected with the hook, and a movable rod provided with two cams of which one operates upon the folders and the other upon the rocker-arm, substantially as described.

5. In a machine of the class specified the combination of means for gathering or folding a blank, needle mechanism, a hook and its actuating mechanism, a pivotal finger having a cam projection, and a movable rod equipped with a cam arranged to coöperate with said cam projection, substantially as described.

6. In a machine of the class specified the combination of means for folding and gathering a blank, needle mechanism for inserting a string in the blank, a pivotal finger having a cam projection, a back-stop for the finger, and a reciprocating rod fitted with a cam on the face of which the cam projection rides, substantially as described.

7. A machine of the class specified comprising needle mechanism, a folder-head and the folders, a hook, means for imparting rectilinear motion to the hook, a pivotal finger provided with a cam projection, a reciprocating rod having a cam which rides under the cam projection, and a reciprocating rod having two cams of which one operates upon the folders and the other upon the means which actuate the hook, substantially as described.

8. In a machine of the class specified the combination with the stringing mechanism including needles and a hook for engaging a string between them, of spring-actuated movable holders for the ends of the strings, substantially as described.

9. In a machine of the class specified the combination with the stringing mechanism including needles and a hook for engaging a string between them, of string-holders comprising spring-actuated pivotal arms equipped with split pins, and their stops, substantially as described.

10. In a machine of the class specified the combination with the folders and needles, of pivotal openers and closers applied to the folders and arranged to coöperate with the latches of the needles, substantially as described.

11. In a machine of the class specified the combination of the folders, the needles, and openers and closers comprising blades pivoted to the folders, and stops for the blades, substantially as described.

12. In a machine of the class specified the combination with the folders and needles, of openers and closers consisting of blades pivoted to the folders and provided with notches, and stops for the blades, substantially as described.

13. A machine of the class specified comprising the folder-head and folders, a pivotal finger provided with a cam projection, a hook, mechanism for reciprocating the hook in a straight line, a handle, needles operatively connected with the handle, a rod operatively connected with the handle and provided with a cam which rides under the cam projection, and a second rod operatively connected with the handle and provided with two cams whereof one operates the folders and the other the hook-actuating mechanism, substantially as described.

14. A machine of the class specified comprising the folder-head and folders, a pivotal finger provided with a cam projection, a hook, mechanism for reciprocating the hook in a straight line, a handle, needles operatively connected with the handle, a rod operatively connected with the handle and provided with a cam which rides under the cam projection, a second rod operatively connected with the handle and provided with two cams whereof one operates the folders and the other the hook-actuating mechanism, and a holder for the ends of the strings, substantially as described.

15. A machine of the class specified comprising the folder-head and folders, a pivotal finger provided with a cam projection, a hook, mechanism for reciprocating the hook in a straight line, a handle, needles operatively connected with the handle, a rod operatively connected with the handle and provided with a cam which rides under the cam projection, a second rod operatively connected with the handle and provided with two cams whereof one operates the folders and the other the hook-actuating mechanism, and openers and closers comprising notched blades pivoted to the folders, and their complemental back-stops, substantially as described.

16. A machine of the class specified comprising the folder-head and folders, a pivotal finger provided with a cam projection, a hook, mechanism for reciprocating the hook in a straight line, a handle, needles operatively connected with the handle, a rod operatively connected with the handle and provided with a cam which rides under the cam projection, a second rod operatively connected with the handle and provided with two cams whereof one operates the folders and the other the hook-actuating mechanism, a holder for the ends of the strings, openers and closers comprising notched blades pivoted to the folders, and their complemental back-stops, substantially as described.

In testimony whereof I have hereunto signed my name.

JAMES H. RUSSELL.

In presence of—
GEO. S. BARROWS,
FRANK L. KELLNER.